Patented June 26, 1945

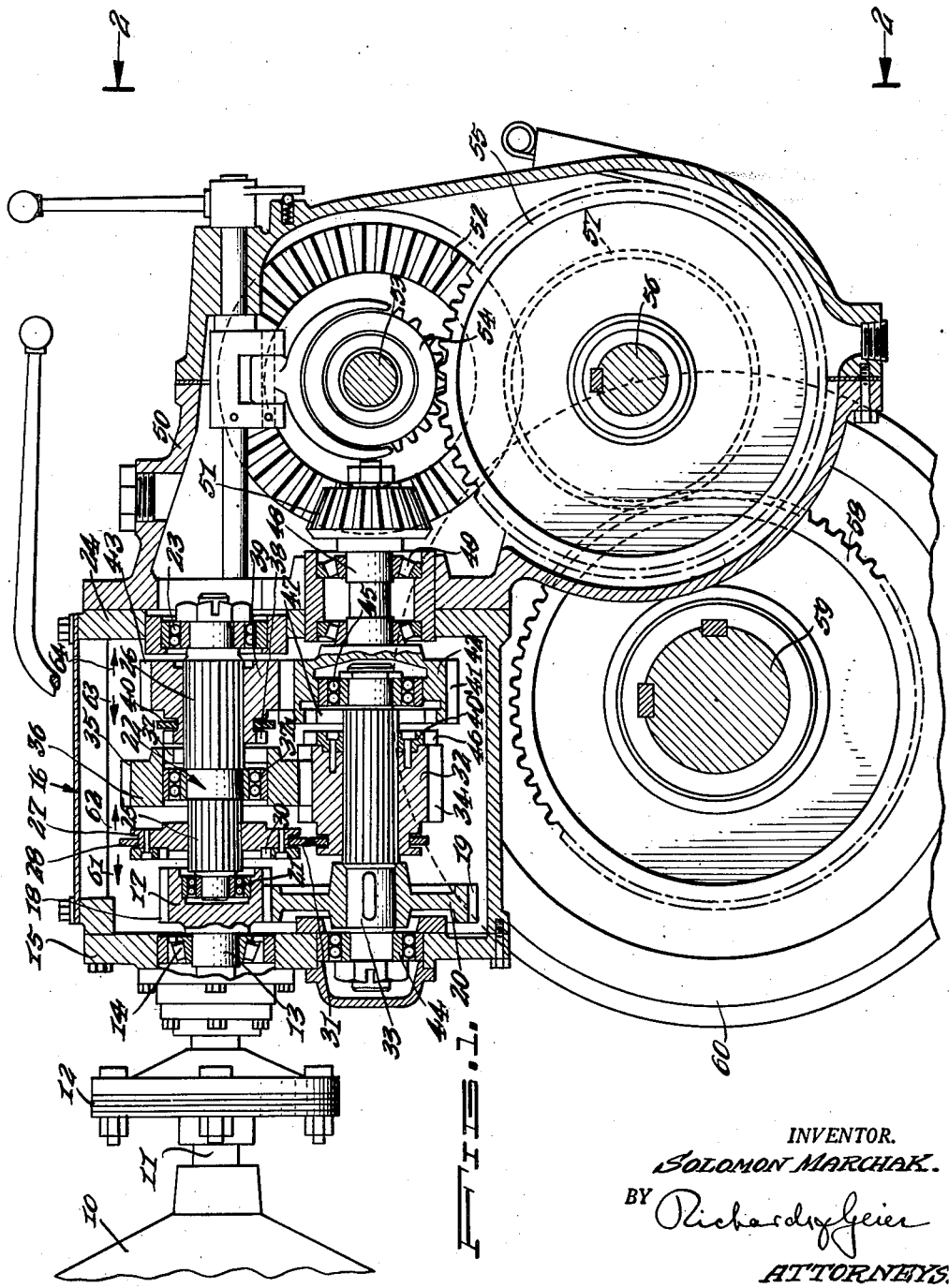

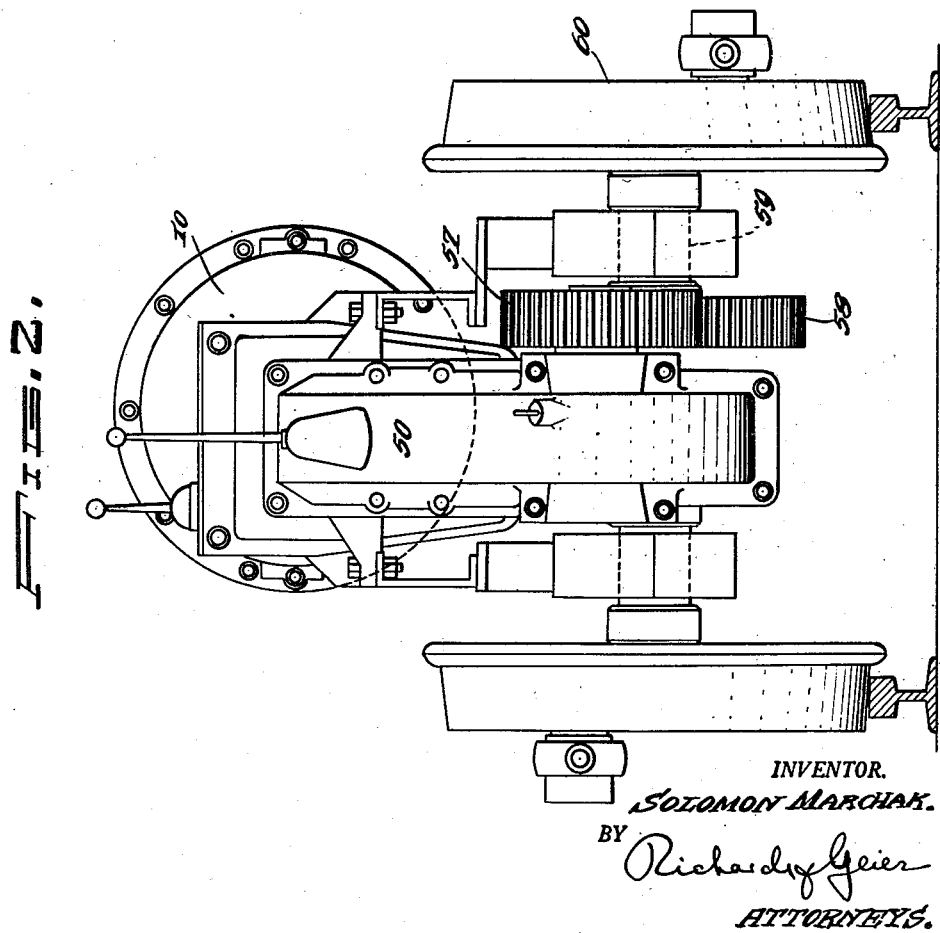

2,379,021

UNITED STATES PATENT OFFICE 2,379,021

LOCOMOTIVE

Solomon Marchak, New York, N. Y.

Application September 10, 1943, Serial No. 501,746

3 Claims. (Cl. 74—333)

This invention relates to locomotives and refers more particularly to a mechanical transmission mechanism for Diesel locomotives used in mines and the like.

Locomotives operated by Diesel engines were provided heretofore with electrical means or chain drives transmitting the power from the Diesel engine to the driving axle of the locomotive. Such means are often expensive, cumbersome and unreliable in operation.

An object of the present invention is the provision of a single mechanical transmission mechanism between a Diesel engine and the driving axle of a comparatively small locomotive used in mines and for other similar purposes, said transmission mechanism being comparatively inexpensive to manufacture and reliable in operation.

Another object is the provision of a mechanical transmission mechanism for Diesel locomotives by means of which all the required speeds can be quickly and easily attained.

A further object of the present invention is the provision of a mechanical transmission mechanism for Diesel locomotives having a comparatively small number of parts which can be easily removed and substituted by new ones whenever necessary.

Other objects of the present invention will become apparent in the course of the following specification:

In accomplishing the objects of the present invention, it was found advisable to provide a transmission mechanism having three shafts, one of which is a stub shaft connected with the clutch of the Diesel engine. The other two shafts carry various gears. One of said gears is integral with the shaft stub and is separated from one of the gear-carrying shafts by a ball bearing while another gear is keyed upon the other gear-carrying shaft and meshes with the first gear. The first gear-carrying shaft carries a slidable coupling gear which may be moved into engagement with the first gear thereby providing a direct connection between the first gear-carrying shaft and the clutch. Another movable coupling gear is mounted upon the first gear-carrying shaft and may swing into engagement with a gear rotatably mounted upon the first gear-carrying shaft and meshing with another gear keyed upon the second gear-carrying shaft. This arrangement may be supplemented by a further gear meshing with one of the gears upon the first gear-carrying shaft, and rotatably mounted upon the second gear-carrying shaft. The described arrangement may be conveniently utilized for attaining at least three different speeds.

The invention will appear more clearly from the following detailed description when taken in connection with accompanying drawings showing by way of example a preferred embodiment of the inventive idea.

In the drawings:

Figure 1 shows partly in side elevation and partly in section, a transmission mechanism constructed in accordance with the principles of the present invention.

Figure 2 is a side view looking in the direction of arrows 2—2 of Figure 1.

The transmission mechanism shown in the drawings is driven from a Diesel engine not shown which is connected with a clutch 10. The clutch 10 is connected by a shaft 11 with flexible coupling 12. The other side of the coupling is firmly connected with a shaft stub 13, which is carried by bearings 14 upon a plate 15 constituting a part of a casing 16.

The shaft stub 13 may be integral with a gear wheel 17. The gear wheel 17 has teeth 18 which are wider than the teeth 19 of a gear wheel 20. The teeth 18 and 19 of the gear wheels 17 and 20 are in engagement with each other.

The gear wheel 17 has a recess located upon the outer side thereof. This recess carries a ball bearing 21. The bearing 21 supports one end of a shaft 22. The opposite end of the shaft 22 is supported by a ball bearing 23, which is carried upon a side plate 24 constituting a part of the casing 16. The shaft 22 has two grooved or ribbed portions 25 and 26.

A coupling gear 27 is mounted on the portion 25 of the shaft 22. The gear 27 rotates along with the shaft 22 but is slidable in relation to that shaft by means of a device 28 which can be conveniently operated by the engineer and which is illustrated diagrammatically in the drawings. The gear wheel 27 carries an inner crown 30 which may be moved into engagement with the teeth 18 of the gear wheel 17.

The gear wheel 27 is further connected by the member 31 with a gear wheel 32, which is mounted upon a shaft 33. The gear wheel 32 has teeth 34 which mesh with the teeth 35 of a gear wheel 36. The gear wheel 36 is rotatable upon a ball bearing 37a which is mounted upon the shaft 22.

The gear wheel 36 carries an inner crown 37 which may be engaged by the teeth 38 of a coupling gear 39, which is slidable upon the shaft portion 26 by means of a device 40. The coupling gear 39 rotates along with the shaft 22 and is further provided with teeth 43 which mesh with the teeth 41 of a gear wheel 42.

The shaft 33 extends parallel to the shaft 22. One end of the shaft 33 is carried by ball bearings 44, which are supported by the plate 15 of the casing 16. The opposite end of the shaft 33 is carried by ball bearings 45 which are located within the gear wheel 42.

As already stated, the gear wheel 20 is keyed upon the shaft 33 and meshes with the gear wheel 17. Another gear wheel 32 is connected with the coupling wheel 27 and is slidable upon the shaft 33. This portion of the shaft 33 is provided with ribs so that the gear 32 rotates along with the shaft 33. The gear 32 is firmly connected with a front wheel 40' having teeth 46. The teeth 46 may be brought into engagement with the inner teeth 47 of the wheel 42. The wheel 42 meshes with the gear wheel 39 and carries an inner ball bearing 45 which supports the shaft 33.

The gear wheel 42 is integral with a shaft stub 48 which is carried upon bearings 49 mounted in the side plate 24 and in a casing 50, which is connected with the casing 16.

The outer end of the shaft stub 48 has a form of a bevel gear 51 which meshes with a large bevel gear 52 carried upon a shaft 53 within the casing 50.

The bevel gear 53 is connected with a toothed gear 54 which meshes with a large toothed gear 55. The gear 55 is keyed upon a shaft 56 which also carries a gear 57. The gear 57 meshes with a gear 58 which is keyed upon the axle 59 of the locomotive. The axle 59 transmits its rotation to the wheels 60 of the locomotive.

In the position shown in Figure 1 the shaft 11 of the clutch 10 drives the coupling 12 which is illustrated in its closed position. The rotation of the coupling 12 is transmitted through the shaft stub 13 to the gear 17 which is integral therewith. The gear 17 meshes with the gear 20 keyed upon the shaft 33 so that the rotation of the shaft 13 is thereby transmitted to the shaft 33.

The shaft 33 rotates along with the gear 32 which meshes with the gear 36. However, in the position shown in Figure 1, the gear 36 is freely mounted upon the bearing 37 so that the rotation of the gear 36 is not transmitted to any other member.

The engineer may provide a positive connection between the Diesel engine and the axle 59 by shifting the coupling gear 27 in the direction of the arrow 61 to a position in which the inner crown 30 of the coupling gear 27 is brought into engagement with the teeth 18 of the gear 17.

Then a direct connection is established between the gear 17 and the shaft 22 by means of the engagement of the teeth 18 with the inner crown 30. The rotation of the shaft 22 is transmitted through the gear wheel 39 to the gear wheel 42 which is in engagement with the gear 39. Since the gear 42 is integral with the shaft stub 48, the shaft stub 48 rotates along with the gear 42 and transmits its rotation through the bevel gears 51 and 52 to the shaft 53. Thence the rotation is transmitted through the gears 54 and 55 and the shaft 56 to the gears 57 and 58 and the axle 59.

The engineer may also shift the coupling gear 27 in the opposite direction of the arrow 62. Then the wheel 32 will be also shifted and an operative connection will be established between the gear 32 keyed upon the shaft 33, and the gear 42.

Then the connection will be established from the shaft stub 13 to the gear wheel 17, the gear 20, the shaft 33, the gear 32, the gear 40, and the gear 42 to the shaft stub 48 and the bevel 51. It is obvious that the axle 59 will be rotated then at a different speed.

The transmission is further provided with a movable coupling element 39 which may be operated by the engineer through the use of the usual device 40.

The engineer may shift the coupling gear 39 in the direction of the arrow 63 until the teeth 38 of the gear 39 are brought into engagement with the inner teeth 37 of the gear 36.

Then power transmission takes place from the gear 17 to the gear 20 and thence through the shaft 33, the gear 32 and the gears 36 and 39 to the gear 42, which drives the shaft stub 48 and the bevel 51.

It is apparent that the described transmission mechanism provides sturdy and effectively operating means for transmitting power from a Diesel engine to the wheels of a locomotive of the type used in mines and for similar purposes.

An important feature of the described construction is the insertion of a stub shaft or shaft stub 17 between the Diesel operated clutch 12 and the gear-carrying shaft 22.

It is apparent that the example shown above has been given by way of illustration and not by way of limitation and that it is subject to wide variations and modifications without departing from the scope or intent of the present invention. All of such variations and modifications are to be included within the scope of the present invention.

What is claimed is:

1. A transmission for driving a driven shaft from a coupling with a plurality of speeds, said transmission comprising in combination two gear-supporting shafts, a gear operatively connected with said coupling and rotatable independently of said gear-supporting shafts, another gear meshing with the first gear and keyed upon the second gear-supporting shaft, a third gear rotatable along with the second gear-supporting shaft, a fourth gear meshing with the third gear, a fifth gear rotatable along with the first gear-supporting shaft and shiftable thereon for operatively engaging the fourth gear, a sixth gear rotatable independently of said gear-supporting shafts and meshing with the fifth gear, and means operatively connecting said sixth gear with said driven shaft.

2. In a locomotive for mines and the like, a transmission for driving a driven shaft from a coupling with a plurality of speeds, said transmission comprising in combination two gear-supporting shafts, a shaft stub operatively connected with said coupling, a gear integral with said shaft stub and having a recess formed therein for receiving an end of the first gear-supporting shaft, a bearing between said gear and said end of the first gear-supporting shaft, a second gear meshing with the first gear and keyed upon the second gear-supporting shaft, a third gear rotatable along with the second gear-supporting shaft and mounted thereon, a fourth gear meshing with the third gear, a bearing carrying the fourth gear and carried by the first gear-supporting shaft, a fifth gear rotatable along with the first gear-supporting shaft and shiftable thereon for operatively engaging the fourth gear, a sixth gear meshing with the fifth gear end having a recess formed therein for receiving an end of the second gear-supporting shaft, a bearing between the sixth gear and said end of the second gear-supporting shaft, and means operatively connecting said sixth gear with driven shaft.

3. In a locomotive for mines and the like, a transmission for driving a driven shaft from a coupling with a plurality of speeds, said transmission comprising in combination two gear-supporting shafts, a gear operatively connected with said coupling and rotatable independently of said gear-supporting shafts, another gear meshing with the first gear and keyed upon the second gear-supporting shaft, a third gear rotatable along with second gear-supporting shaft and shiftable relatively thereto, a fourth gear meshing with the third gear and rotatable independently of said shafts, a fifth gear rotatable along with the first gear-supporting shaft and shiftable thereon for operatively engaging the fourth gear, a sixth gear rotatable independently of said gear-supporting shafts and meshing with the fifth gear, a clutch member rotatable along with the first gear-supporting shaft and shiftable thereon for operative engagement with the first gear, the third gear being adapted to engage operatively the sixth gear, and means operatively connecting the sixth gear with said driven shaft.

SOLOMON MARCHAK.